United States Patent
Messerschmidt

Patent Number: 6,034,370
Date of Patent: *Mar. 7, 2000

[54] MULTISOURCE INFRARED SPECTROMETER

[76] Inventor: Robert G. Messerschmidt, 1000 Parkland Pl. SE., Albuquerque, N.Mex. 87108

[*] Notice: This patent is subject to a terminal disclaimer.

[21] Appl. No.: 09/176,884

[22] Filed: Oct. 22, 1998

Related U.S. Application Data

[63] Continuation of application No. 08/674,869, Jul. 2, 1996, Pat. No. 5,828,066.

[51] Int. Cl.[7] ................................................. G01N 21/35
[52] U.S. Cl. ......................................................... 250/339.07
[58] Field of Search ........................................ 250/339.07

[56] References Cited

U.S. PATENT DOCUMENTS

| | | |
|---|---|---|
| H1354 | 9/1994 | Martinez .................. 250/352 |
| 2,706,253 | 4/1955 | Hutchins et al. . |
| 3,402,001 | 9/1968 | Fleisher . |
| 3,815,090 | 6/1974 | Muenchhausen . |
| 3,969,699 | 7/1976 | McGlaughlin . |
| 3,982,227 | 9/1976 | Joynson et al. . |
| 4,134,134 | 1/1979 | Lux . |
| 4,389,673 | 6/1983 | Despois et al. . |
| 4,421,985 | 12/1983 | Billingsley et al. . |
| 4,615,619 | 10/1986 | Fately . |
| 4,687,926 | 8/1987 | Plummer . |
| 5,225,678 | 7/1993 | Messerschmidt . |
| 5,319,214 | 6/1994 | Gregory et al. ............... 250/504 R |
| 5,457,566 | 10/1995 | Sampsell et al. ................ 359/292 |
| 5,475,221 | 12/1995 | Wang . |
| 5,828,066 | 10/1998 | Messerschmidt ............ 250/339.07 |
| 5,854,685 | 12/1998 | Levine ............................. 356/440 |

*Primary Examiner*—Constantine Hannaher
*Attorney, Agent, or Firm*—Antton & Associates P.C.

[57] ABSTRACT

A spectrometer having a source of broad band infrared energy, a relay mirror that focuses the infrared energy at an intercepting mirror, a first object mirror that collimates the infrared energy from the intercepting mirror, a spatial light modulator that receives the collimated infrared energy and reflects it back to the first object mirror, the spatial light modulator including deformable mirror elements, and a controller that deforms the mirror elements according to a predetermined pattern. Deformable mirror elements obtain needed spectra while reducing the mechanical complexity of the spectrometer.

9 Claims, 6 Drawing Sheets

MULTISOURCE INFRARED SPECTROMETER

Related Application

The present application is a continuation of U.S. patent application Ser. No. 08/674,869, filed on Jul. 2, 1996, now U.S. Pat. No. 5,828,066.

BACKGROUND AND SUMMARY OF THE INVENTION

Previous spectrometers have required moving parts to obtain the dispersion of light into its constituent wavelength components. Such moving parts include scanning a diffraction grating to move the dispersed light across the entrance slit of a spectrometer or oscillating a mirror to produce the changing interference patterns for a interferometer. Moving parts have an obvious disadvantage in imposing substantial mechanical complexity into the spectrometer. In some sense the spectral resolution of the spectrometer is always limited by the mechanical precision of its construction and by the mechanical precision of its maintenance. Such mechanical constraints also necessarily limit the mechanical rigidity, stability and transportability of the spectrometer.

Conventional sample analysis using a spectrometer has also been limited to sampling a single area of a specimen plane at a time. This is unfortunate in that many spectroscopic analyses require taking the spectrum of multiple adjacent areas on a specimen. Constructing a matrix of the spectra of an entire sample area is therefore a complex, time consuming operation that is rarely performed.

It is an objective of the present invention to use electrical components to perform all deflections of a beam of light that are needed to obtain a spectrum. It is another objective of the present invention to produce multiple spectra of a sample area using optoelectronic components. It is another objective of the present invention to facilitate making both the dispersive and interferometric measurements of the spectral constituents of light using electrical components.

The present invention achieves these and other objectives using a multisource infrared spectrometer having a source of broad band infrared energy, a relay mirror that focuses the infrared energy at an intercepting mirror, a first object mirror that collimates the infrared energy from the intercepting mirror, a spatial light modulator that receives the collimated infrared energy and reflects it back to the first object mirror, the spatial light modulator including deformable mirror elements, and a controller that deforms the mirror elements according to a predetermined pattern.

A BRIEF DESCRIPTION OF THE DRAWINGS

DETAILED DESCRIPTION

Figure 1:
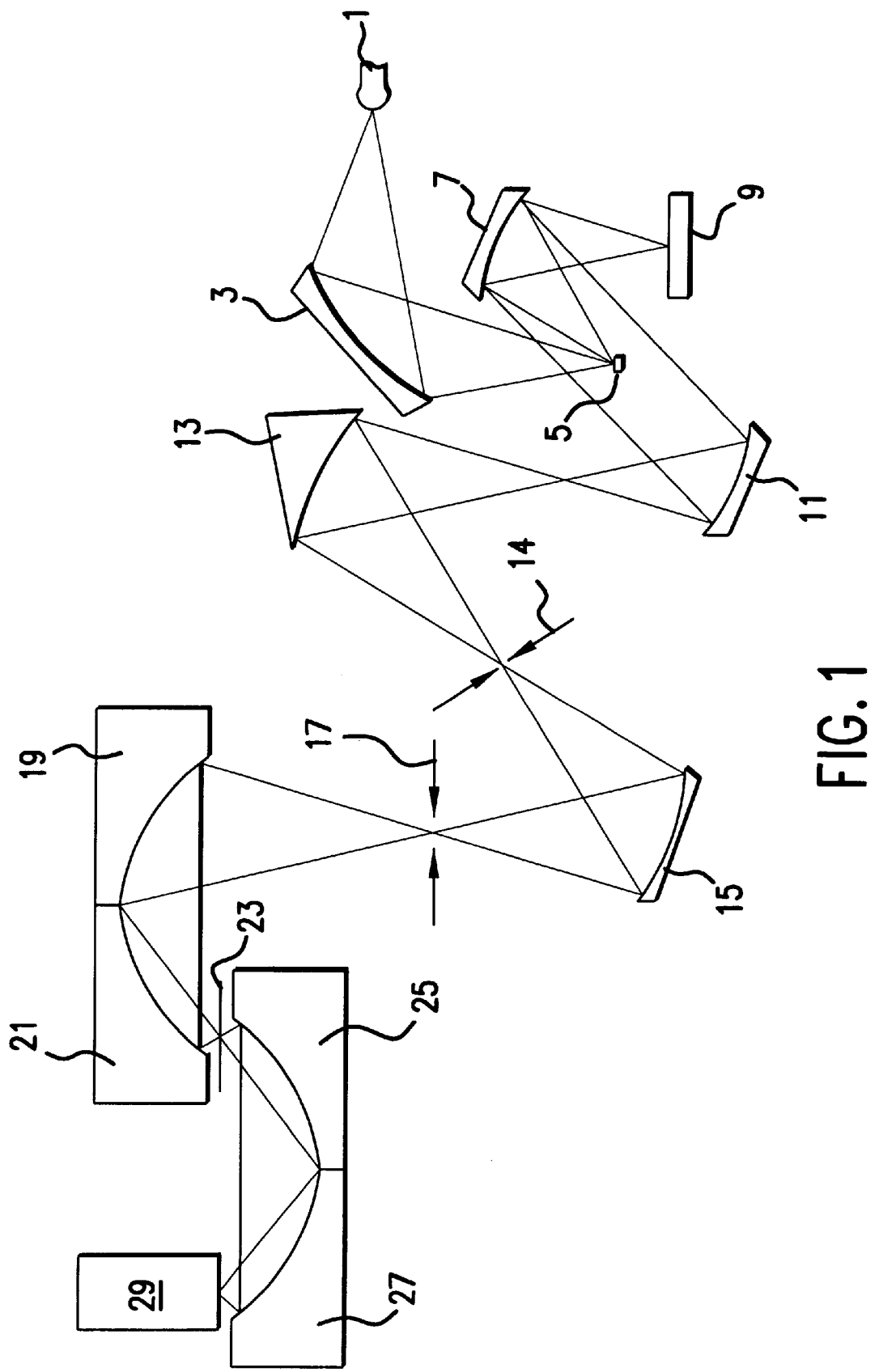
FIG. 1 is a multisource infrared spectrometer according to the present invention that is configured as an infrared microscope.

FIG. 1 shows a multisource infrared spectrometer of the present invention. An off-axis concave parabolic focusing mirror 3 focuses light from a source 1 to a pick-off mirror 5. An off-axis parabolic mirror 7 focuses the light from the pick-off mirror 5 onto the reflective surface of a deformable mirror device (DMD) 9.

Figure 2:
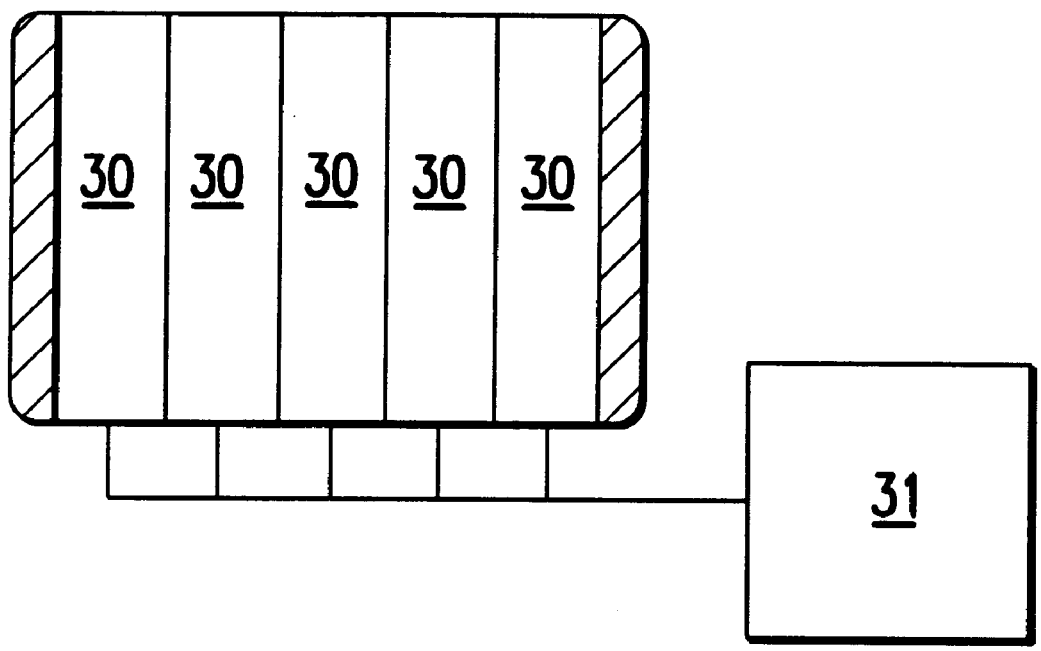
FIG. 2 and FIGS. 3a and 3b show details of a deformable mirror device that can operate as a spatial light modulator in the spectrometers shown in FIGS. 1, 4 and 5.
Figure 3A:
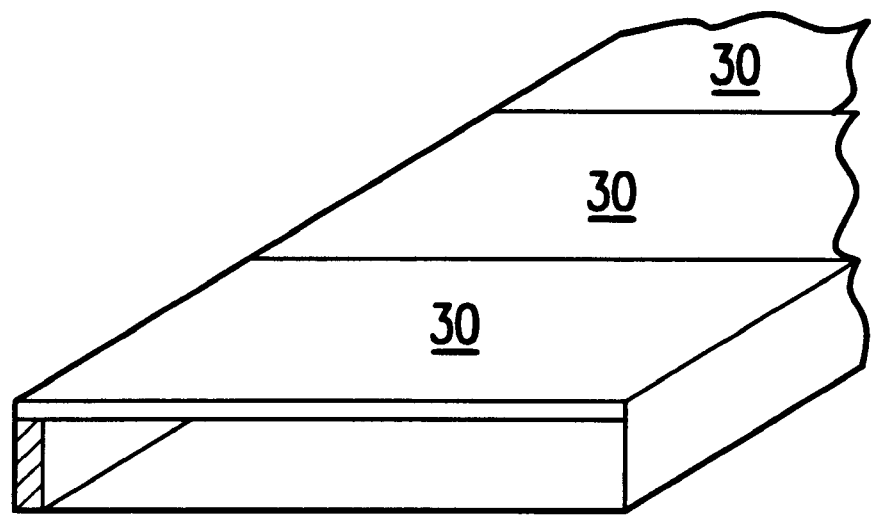
Figure 3B:
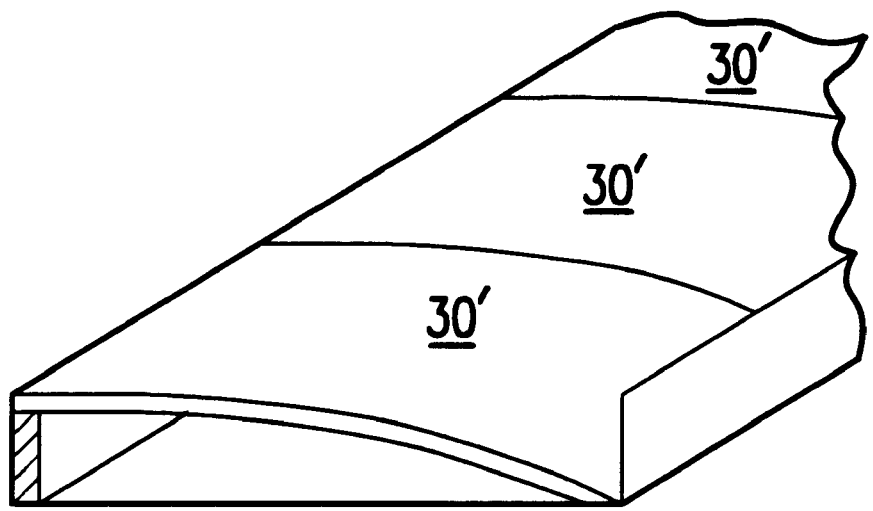

FIG. 2 shows the reflective surfaces of the DMD 9. FIG. 3a shows the reflective surfaces 30 of DMD 9 in a rest state. An electric signal from a control circuit 31 causes a series of reflective surfaces 30 to deflect as shown in FIG. 3b. The selection, construction, operation of a suitable control circuit 31 is considered to be within the capability of a person of ordinary skill in the art.

An off-axis parabolic mirror 11 together with off-axis parabolic mirror 7 collimate deflected light from the DMD 9. Together with the pick-off mirror 5, these mirrors comprise a Schlieren stop. Mirror 11 directs the light through a focus to diffraction grating 13. A multisource infrared spectrometer wherein the diffraction grating and transfer mirror are a holographic concave mirror. Such diffraction gratings are known in the art and therefore not a subject of the present invention.

Diffraction grating 13 disperses the light into its constituent wavelength components, and focuses them onto an entrance slit 14. Another off axis parabolic mirror 15 focuses the light from the entrance slit 14 to a mask 17. As shown, identical, symmetrical parabolic mirrors 19, 21, 25 and 27 form a microscope having a unitary magnification and image the mask 17 onto a specimen plane 23 and a detector 29. The operation of the microscope formed by mirrors 19, 21, 25 and 27 is known since it is described in U.S. Pat. No. 5,225,678 and incorporated herein by reference. This microscope is shown merely to example one form of sampling accessory. It is to be understood that many different types of sampling accessories could direct the light to a specimen plane 23 and on to a detector 29.

The multisource spectrometer shown in FIG. 1 operates so that the DMD 9 functions as a spatial light modulator to control the spectral content of the light. Deflectable elements 30 comprise cantilevered beams that, by deflecting as shown by deflected elements 30' in FIG. 3b, shift light into the entrance slit of the spectrometer. The Schlieren stop formed by pick-off mirror 5 and off-axis parabolic mirrors 7 and 11 permit the DMD 9 to act as the source for the diffraction grating 13 in which each of the deformable mirror elements 30 comprise a source of a different color. Modulating DMD 9 allows the light to be scanned over the entrance slit 14 so as to vary the spectral content of the light reaching specimen plane 23. The modulation of the control signal for the DMD 9 is then correlated with the signal received by detector 29 to produce a spectrum of the sample. The correlation of an acceptable electronic processing controller for deflecting the elements of the DMD into a predetermined patterned for the purpose of implementing the present invention is believed to be within the level of one of ordinary skill in the art.

Figure 4:
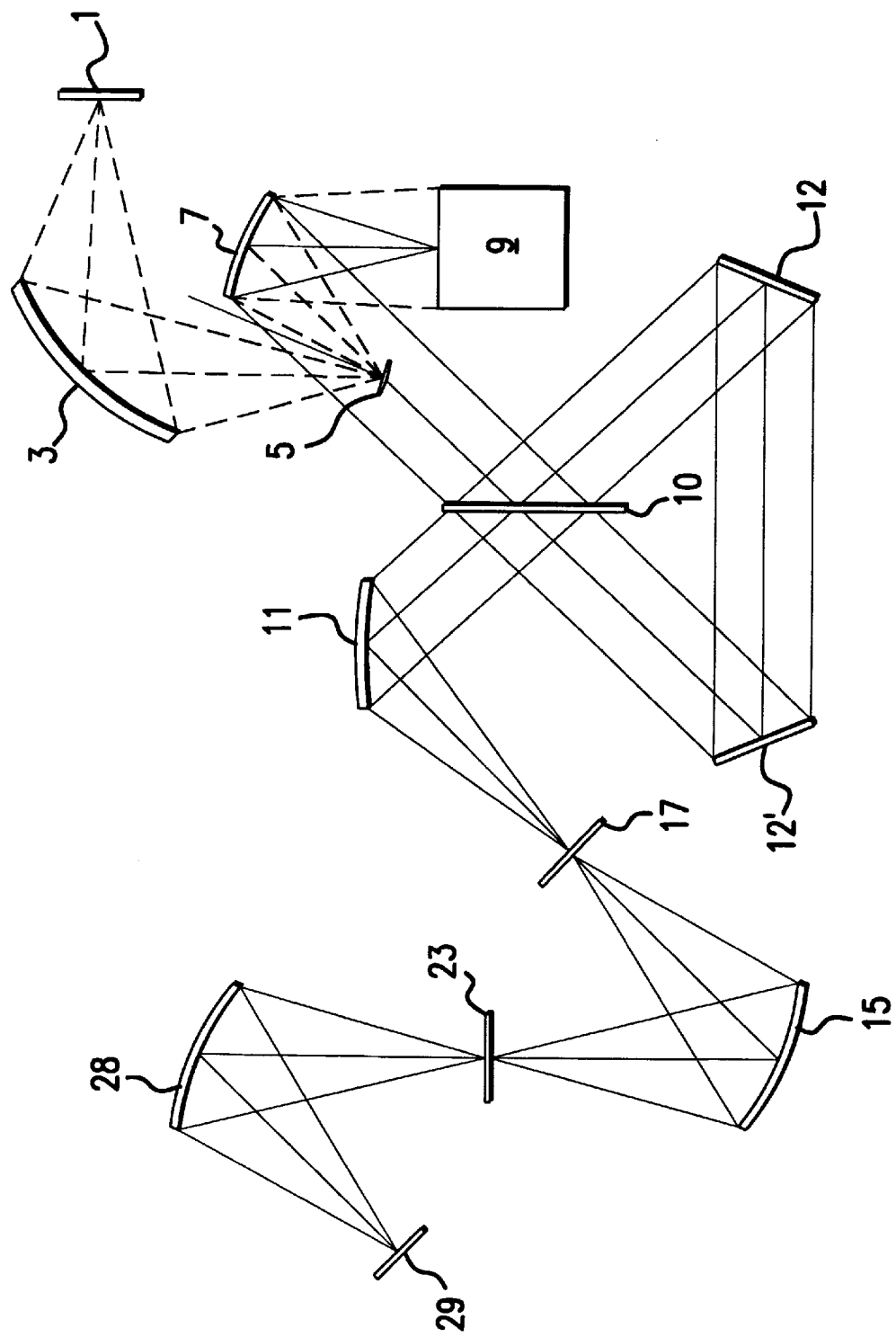
FIG. 4 is another multisource infrared spectrometer according to the present invention.

FIG. 4 shows another multisource infrared spectrometer according to the present invention. This spectrometer modifies that shown in FIG. 1 by inserting an a partially reflective beam splitter 10 and interferometric mirrors 12, 12' before off-axis transfer mirror 11. Operating the DMD 9 in the manner described above shifts the light vertically across the beam splitter 10. This shift has the effect of changing the path length of the light so as to set up interference in the two arms represented by mirrors 12 and 12'. The light is then directed to the detector 29 through the specimen plane 23 and mask 17 by off-axis parabolic mirrors 11, 15 and 28.

FIG. 4 also shows the specimen plane 23 receiving light directly from the concave parabolic mirror 15. It is to be understood, however, that any sampling accessory could be used to in combination with the multisource infrared spectrometer.

The operation of the multisource infrared spectrometer shown in FIG. 4 has the effect of duplicating a standard Fourier-transform infrared spectrometer. It is therefore contemplated that the same type of fourier analyses of the signal from detector 29 can be used to produce a spectrum. However, the DMD 9 eliminates the need to mechanically oscillate either mirror 12 or 12' to change the path length of the light that is needed to instigate the optical interference. Instead, DMD 9 electronically changes. the location of the light on the surface of beam splitter 10 which then has the effect of changing the path length of the light in each of the arms at mirrors 12 and 12'.

Figure 5:
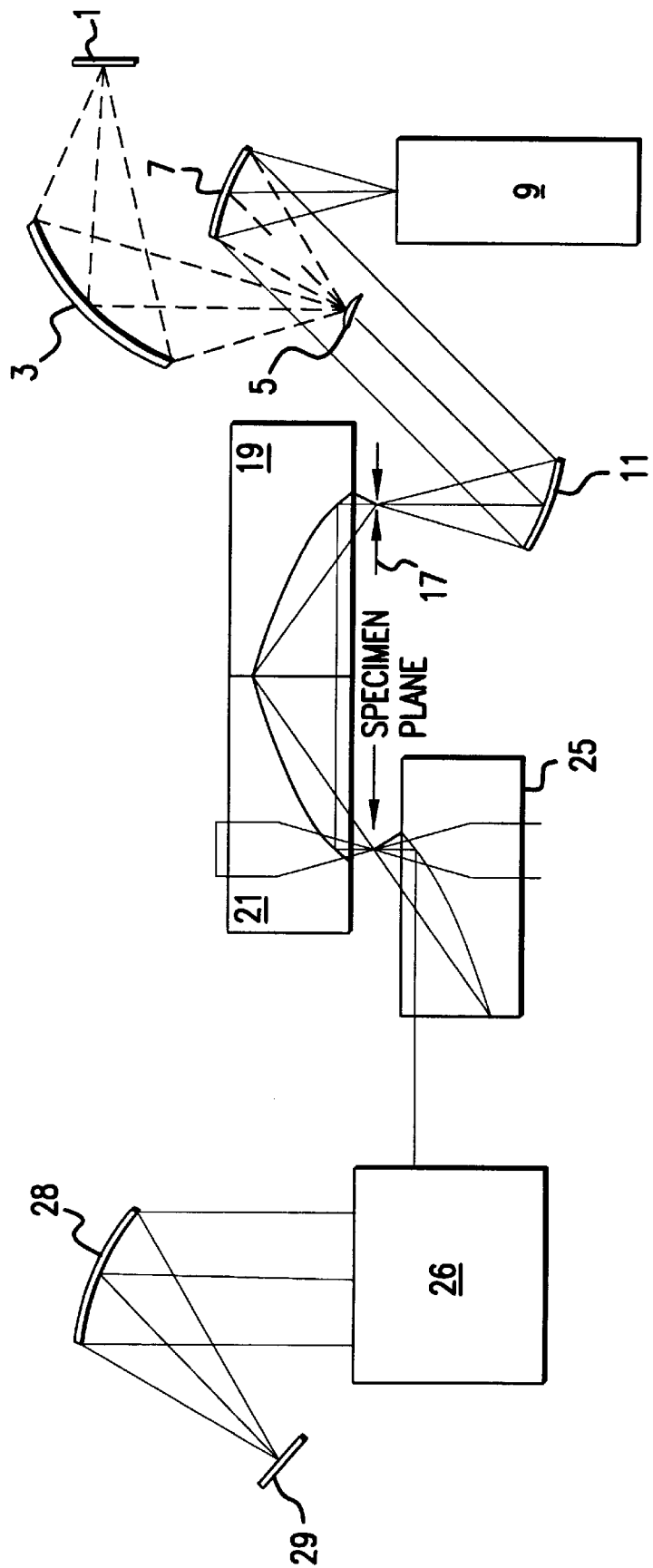
FIG. 5 is another multisource infrared spectrometer according to the present invention.

FIG. 5 shows another multisource infrared spectrometer according to the present invention. The DMD 9 is positioned at a field stop of the infrared microscope formed by parabolic mirrors 19, 21 and 25 of the type described above in connection with FIG. 1. This configuration allows a DMD 9 to act as the mask for the microscope. The individual elements of the DMD spatially define a sampling area on the sample image plane 23 by determining which areas receive light.

Figure 6:
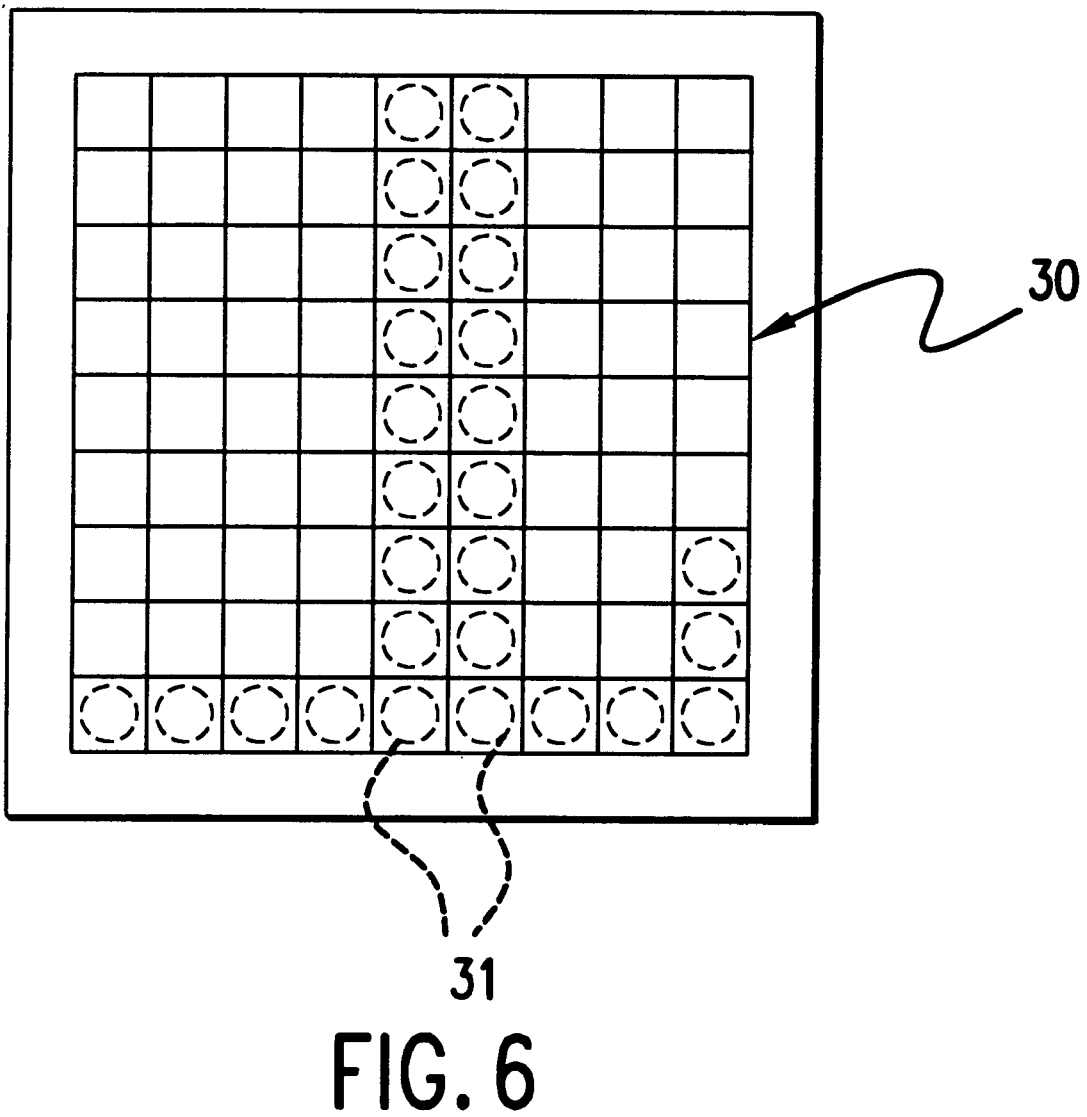
FIG. 6 shows details of another deformable mirror device for use as a spatial light modulator in the spectrometer shown in FIG. 5.

The construction of the DMD 9 shown in FIG. 5 can differ from that shown in FIGS. 2 and 3. This change in construction is motivated by the ability to map the reflective surface 30 of the DMD onto the specimen plane 23 using imaging optics such as that supplied by the microscope shown in FIG. 5. FIG. 6 shows the surface of a suitable DMD 9 for use in the spectrometer shown in FIG. 5. The reflective surface 30 is divided into a plurality of individual cells 31. Each cell when deformed, permits light to be imaged onto the sample image plane 23. The entirety of the matrix delimits a sampling area on the specimen plane 23 once mapped thereon by imaging optics such as the microscope shown.

The spectrometer shown in FIG. 5 permits making simultaneous measurements of multiple areas of the specimen plane 23. The matrix of deformable elements shown in FIG. 6 can be driven according to a Hadamard transform such that half of the elements of DMD 9 are deflected at any given moment, thus permitting half of a sample to be illuminated an any moment. Changing the pattern of illumination changes the half of the elements being illuminated. Changing the pattern according to a Hadamard transform provides a ready way of extracting the spectral features for each element. The principles of sampling using Hadamard transforms are known and therefore not described further.

Parabolic mirror 25 reflects the light from the specimen plane 23 to an interferometer 26 which decomposes the light into its individual spectral components. The interferometer can comprises a conventional Fourier transform spectrometer or one built in accord with FIG. 4 so as to have no parts that are mechanically moved. The off-axis parabolic mirror 28 reflects the light, thus decomposed, to a detector 29. The spectrum of the light can then be obtained using a variety of methods that are known in the art.

It is to be appreciated that the position of the interferometer 26 in FIG. 5 is backward from that commonly found in spectrographic systems. The spectrograph in FIG. 5 effectively reverses the input and output of the spectrometer.

It is to be understood that the deformable mirror device 9 described above is only one way of implementing the spatial light modulation needed to practice the present invention. Other spatial light modulators, such as alternately transparent filters, etc., are known in the art and are suitable for use with the present invention. The objective of the present invention can be achieved with any filter that spatially modulates light. Whether that filter transmits light or, as exemplified above, reflects light in no way precludes its use in the present invention.

It is also to be understood that the foregoing applications of the present invention have been particularly adapted for use in infrared spectrometry. However, there is no reason that the present invention could not be adapted for spectrometry in other wavelength regimes. It is particularly contemplated that the present invention would find applicability in near infrared applications such as required for obtaining spectrum from biological systems.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously thought of. Numerous variations and changes can be made to the foregoing illustrative embodiments without departing from the scope and spirit of the present invention as set forth in the appended claims.

What is claimed is:

1. A multisource infrared spectrometer, comprising:
    a source of broad band infrared energy,
    an intercepting mirror that receives the infrared energy,
    a first object mirror that reflects the infrared energy from the intercepting mirror,
    a spatial light modulator that receives the reflected infrared energy and reflects it back to the first object mirror, the spatial light modulator including deformable mirror elements, and
    a controller that deforms the mirror elements according to a predetermined pattern.

2. A multisource infrared spectrometer as claimed in claim 1, wherein the deformable mirror elements comprise a linear array.

3. A multisource infrared spectrometer as claimed in claim 2, further comprising
    a second object mirror to focus the infrared energy from the spatial light modulator at a spectrograph plane,
    a diffraction grating to disperse the constituent wavelengths of the infrared energy, and
    a transfer mirror to focus the infrared energy at a spectrograph plane.

4. A multisource infrared spectrometer as claimed in claim 2, further comprising
    a refractive beam splitter having first and second sides, each side of the refractive beam splitter reflecting part of the infrared energy from the first object mirror,
    at least first and second transfer mirrors that receive the infrared energy reflected from the first side of the refractive beam splitter and passing through the second side of the refractive beam splitter, respectively, each transfer mirror being positioned to reflect the infrared energy from the spatial light modulator to the other transfer mirror and back to a side of the refractive beam splitter opposite that from which the infrared energy came, and
    a second object mirror to focus infrared energy reflected from the second side of the refractive beam splitter at a field stop.

5. A multisource infrared spectrometer as claimed in claim 1, wherein the deformable mirror elements comprise a two dimensional array.

6. A multisource infrared spectrometer as claimed in claim 5, further comprising
- a second object mirror to focus the infrared energy at a field stop,
- a mask positioned at the field stop to delimit a measuring area, and
- a condenser to map the measuring area onto a specimen plane.

7. A multisource infrared spectrometer as claimed in claim 6, further comprising an spectrograph for separating the broad band infrared energy into constituent wavelength components.

8. A multisource infrared spectrometer as claimed in claim 7, wherein the spectrograph comprises an interferometer.

9. A multisource infrared spectrometer as claimed in claim 1, wherein the predetermined pattern comprises a Hadamard transform.

* * * * *